United States Patent
Kinkead et al.

(10) Patent No.: US 9,986,692 B2
(45) Date of Patent: Jun. 5, 2018

(54) DEBRIS BLOWER

(71) Applicant: Turfco Manufacturing, Inc., Blaine, MN (US)

(72) Inventors: Scott Kinkead, Minneapolis, MN (US); Nicholas Oeding, Shakopee, MN (US); Daryl Halvorson, Cologne, MN (US)

(73) Assignee: Turfco Manufacturing, Inc., Blaine, MN (US)

( * ) Notice: Subject to any disclaimer, the term of this patent is extended or adjusted under 35 U.S.C. 154(b) by 0 days. days.

(21) Appl. No.: 15/424,916

(22) Filed: Feb. 6, 2017

(65) Prior Publication Data

US 2017/0142908 A1    May 25, 2017

Related U.S. Application Data

(62) Division of application No. 14/597,249, filed on Jan. 15, 2015, now Pat. No. 9,560,810.

(60) Provisional application No. 61/983,500, filed on Apr. 24, 2014, provisional application No. 61/928,158, filed on Jan. 16, 2014.

(51) Int. Cl.
*A01G 1/12* (2006.01)
*A47L 5/14* (2006.01)

(52) U.S. Cl.
CPC .................... *A01G 1/125* (2013.01)

(58) Field of Classification Search
CPC ...... A01G 1/125; Y10T 29/49826; A47L 5/14
See application file for complete search history.

(56) References Cited

U.S. PATENT DOCUMENTS

| | | | |
|---|---|---|---|
| 5,090,088 A | 2/1992 | Toth | |
| 6,009,595 A | 1/2000 | Leasure | |
| 6,226,833 B1 * | 5/2001 | Kawaguchi | A01G 1/125 15/330 |
| 7,841,044 B1 * | 11/2010 | Weihl | A01G 1/125 15/340.1 |
| 9,038,232 B1 * | 5/2015 | Morrow | A01G 1/125 15/300.1 |
| 9,510,516 B2 * | 12/2016 | Shumaker | B08B 5/02 |
| 2007/0220702 A1 | 9/2007 | Lauer | |
| 2010/0146730 A1 | 6/2010 | Iacona | |
| 2012/0246865 A1 * | 10/2012 | Lauer | A01D 42/06 15/405 |

(Continued)

*Primary Examiner* — Dung Van Nguyen
(74) *Attorney, Agent, or Firm* — Alan D. Kamrath; Kamrath IP Lawfirm, P.A.

(57) ABSTRACT

A debris blower includes an engine mounted to an engine mount and connected to a turbine. The engine mount and housing of the turbine are respectively mounted between a second side of a frame and first and second longitudinal supports connected to and between first and second sides of the frame. A screen guard is secured utilizing bolts extending in a non-rotatable manner from a top plate connected between the second longitudinal support and the second side. Due to the frame and engine mount having a parallelism and flatness tolerance, the engine and turbine can be aligned without shimming. A sensor senses first and second trip devices positioned at circumferential locations on the exit nozzle to rotate the exit nozzle to preset angles. Remote and hard wire controls each include direction and speed switches. A resume switch throttles the engine between idle and operating speeds.

13 Claims, 7 Drawing Sheets

(56) References Cited

U.S. PATENT DOCUMENTS

2015/0190021 A1* 7/2015 Barkow ............... E01H 1/0809
15/405

* cited by examiner

DEBRIS BLOWER

BACKGROUND

A debris blower and its method of fabrication are disclosed.

Debris blowers have been developed for blowing leaves and other debris from large areas such as golf courses. Generally, a debris blower includes an engine operationally connected to a turbine for creating an air stream which can be directed toward the leaves and debris by a nozzle. Due to the relatively large rotationally speed of the engine and the turbine, it is important that the engine and the turbine be properly aligned on the chassis. Conventionally, such alignment was performed by shimming the housing of the turbine relative to the chassis. Shimming requires extra components and a skilled technician to perform the alignment procedure. Further, servicing the engine, the turbine, and the operational connection therebetween often required the removal of screen guards enclosing the components desired to be serviced. Conventionally, removal and replacement of screen guards was difficult and often required at least two persons.

Further, operators of tow behind debris blowers have a hard time setting the exact angle of the blower nozzle, because it is at the rear of the machine and is hard to see from the operator's position. The operator typically finds an ideal angle to have the nozzle to get the best results of blowing the debris. During operation, operators make a pass with the nozzle pointed downward to the right, get to the end of the pass and then turn around. After turning, the operators want the nozzle to point at the same downward angle but to the left. However, conventional blowers require adjusting the angle until they get it just right. If the operator could preset this angle and automatically go to it, time would be saved trying to set the angle on the fly, as well as a more consistent job of clearing debris would be preformed.

Further, conventional tow behind debris blowers were controlled only by a remote hand held control which was held by the operator sitting on the tow vehicle. If the remote control was ever lost or damaged, the debris blower could not be operated until a replacement unit was ordered and obtained, which often took several days.

As indicated, a typical operation of debris blowers is to make multiple passes and turning around at the end of each pass. During turning, blowing of debris is not needed. As the debris blowers are relatively noisy in operation and more gas is consumed at higher revolutions, operators of conventional debris blowers would throttle down the engine at the end of the first pass and then would throttle up the engine at the beginning of the second pass. However, considerable operator involvement is required to throttle up and throttle down the engine, which is troublesome especially since the operator would be giving attention to the turning operation of the tow vehicle and the tow behind debris blower.

Thus, a need exists for an improved chassis for a debris blower which can be easily fabricated from a few components and which overcomes the deficiencies of conventional debris blowers. Further, a need exists for a manner to preset the angle of the nozzle allowing automatic return to the preset angle when turning is necessary. Additionally, a need exists for a manner to operate the debris blower in the event that the handheld remote was lost or damaged. Furthermore, a need exists for a manner to easily go from a current operating speed down to idle and back again without having to throttle up and down the engine.

SUMMARY

This need and other problems in the field of debris blower design is solved by providing a chassis formed by interconnecting first and second sides extending generally perpendicular between first and second ends to form a rectangular frame. First and second longitudinal supports are extended between and connected to a cross brace extending between and connected to the first and second sides and the first and second ends, respectively. An engine mount extends between and is connected to the second side and the first longitudinal support. The housing of a turbine is connected to the top surfaces of the second side and the second longitudinal support, and an engine is mounted to the engine mount. The connection plane defined by the connections of the turbine housing to the chassis is flat and parallel to a planar top of the engine mount to which the engine is mounted to avoid shimming of the housing relative to the chassis. A screen guard extends between the engine and the housing and is connected by bolts secured to a top plate in a manner to prevent relative movement therebetween, with the top plate extending between and connected to the second side and the second longitudinal support intermediate the housing and the engine mount. Wheels and a hitch are connected to the first end of the chassis to provide mobility to the chassis.

A fuel tank and a battery for the engine and the control box are mounted to another top plate extending between the first side and the first and second longitudinal supports.

First and second trip devices positioned at circumferentially spaced locations about the rotation axis are sensed by a sensor such that the exit nozzle can be rotated to preset angles after turning of the debris blower.

A fixed, hard wired auxiliary control can be actuated by a key switch to allow the blower speed and nozzle direction to be changed in the auxiliary control in the event that the remote handheld control is lost or damaged.

A resume switch throttles the engine between idle and operating speeds before or after turns are completed without intermittently increasing or decreasing the blower speed to reduce gas composition and operation noise during turns.

Illustrative embodiments will become clearer in light of the following detailed description in connection with the drawings.

DESCRIPTION OF THE DRAWINGS

The illustrative embodiments may best be described by reference to the accompanying drawings where.

Figure 1:
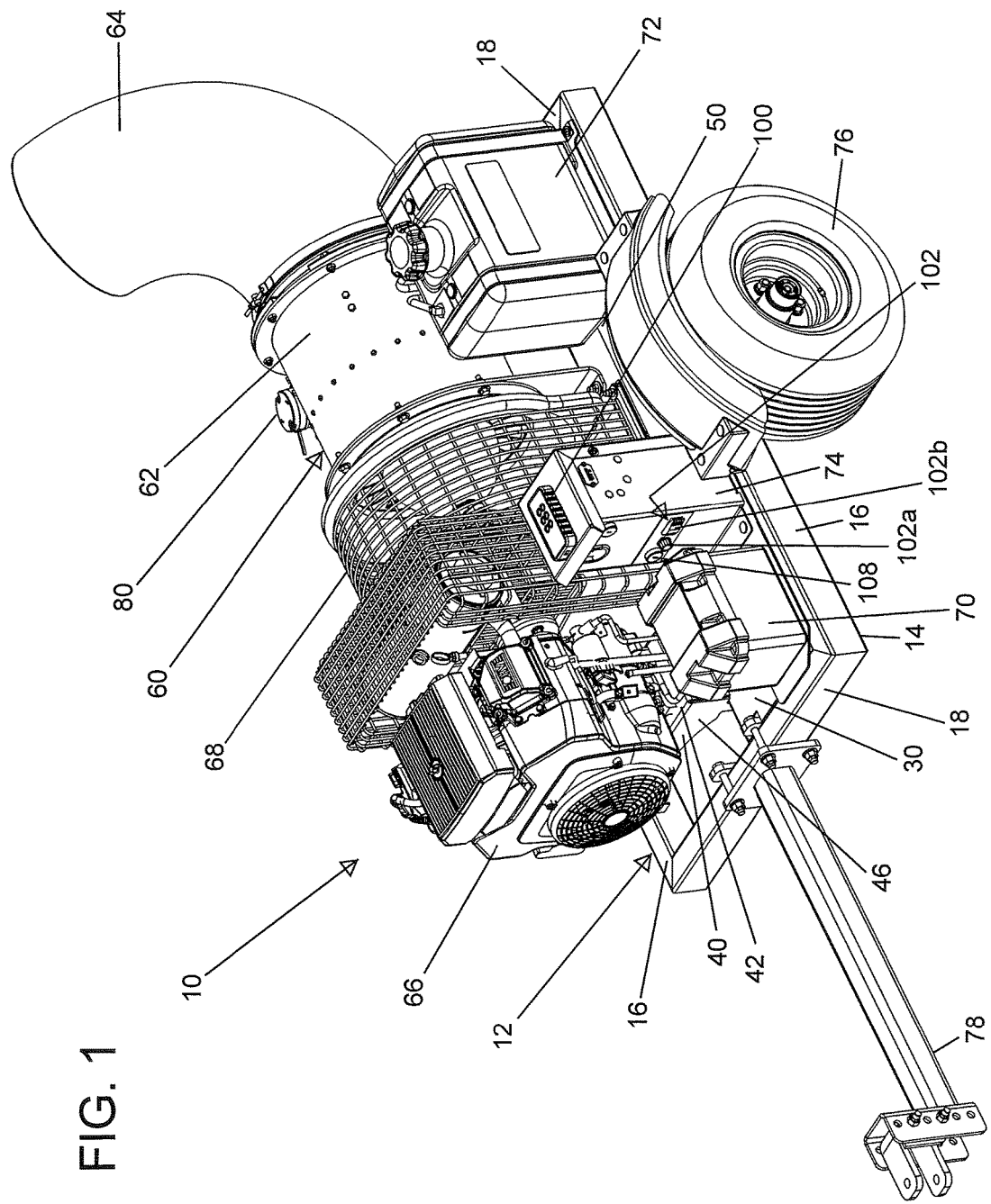
FIG. 1 shows a perspective view of a debris blower.
Figure 2:
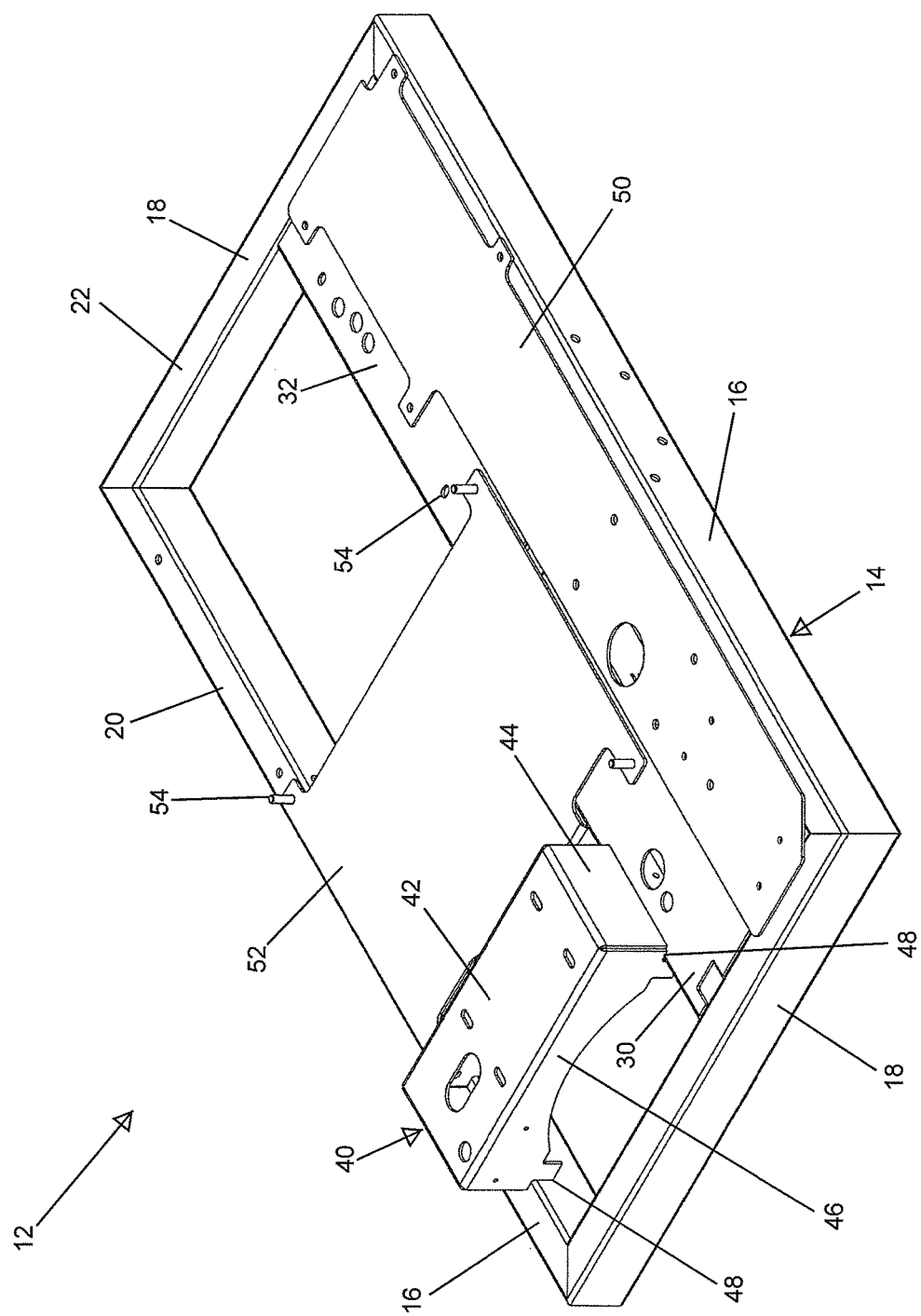
FIG. 2 shows a perspective view of a chassis for the debris blower of FIG. 1.
Figure 3:
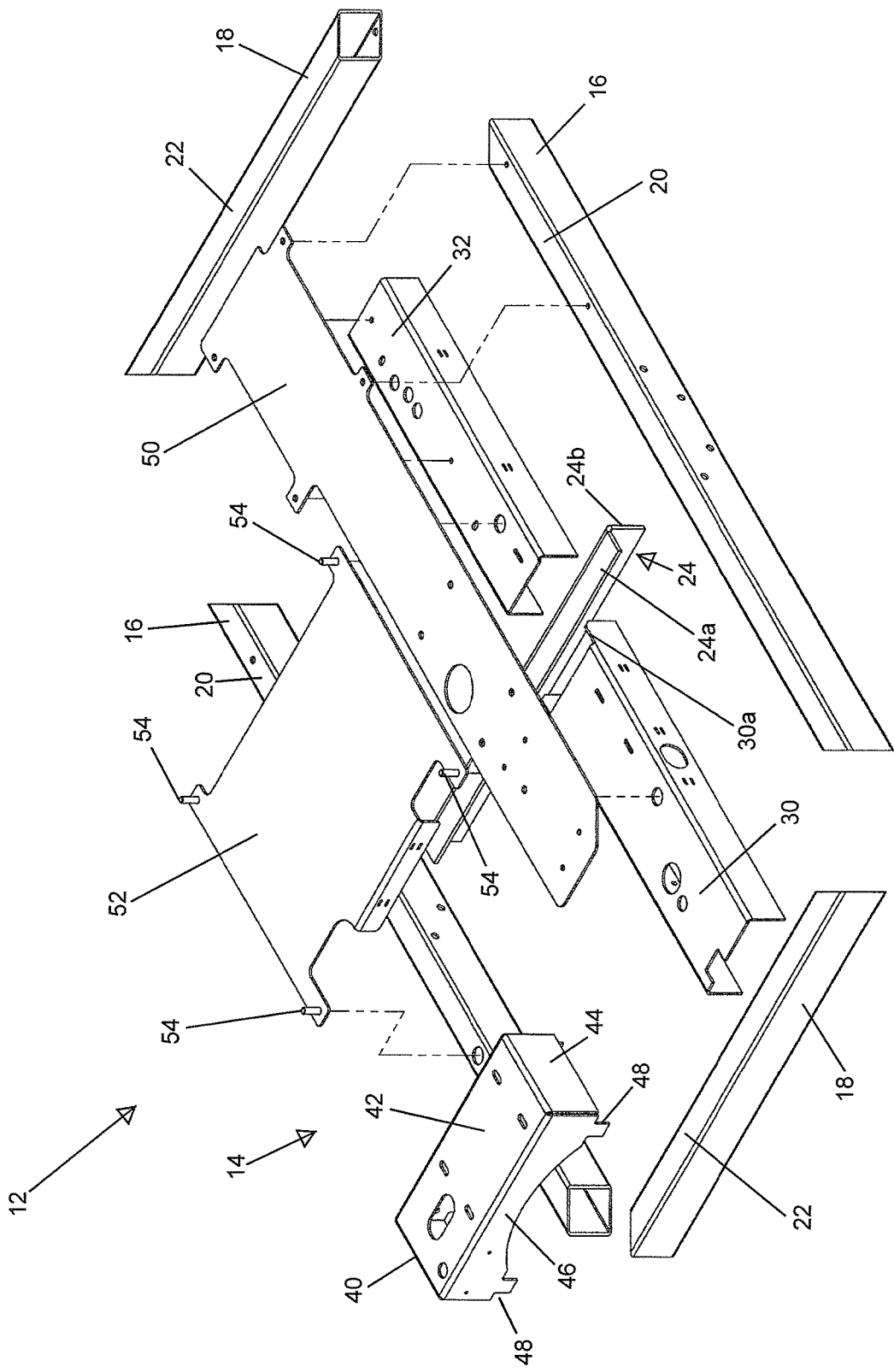
FIG. 3 shows an exploded perspective view of the chassis of FIG. 2.
Figure 4:
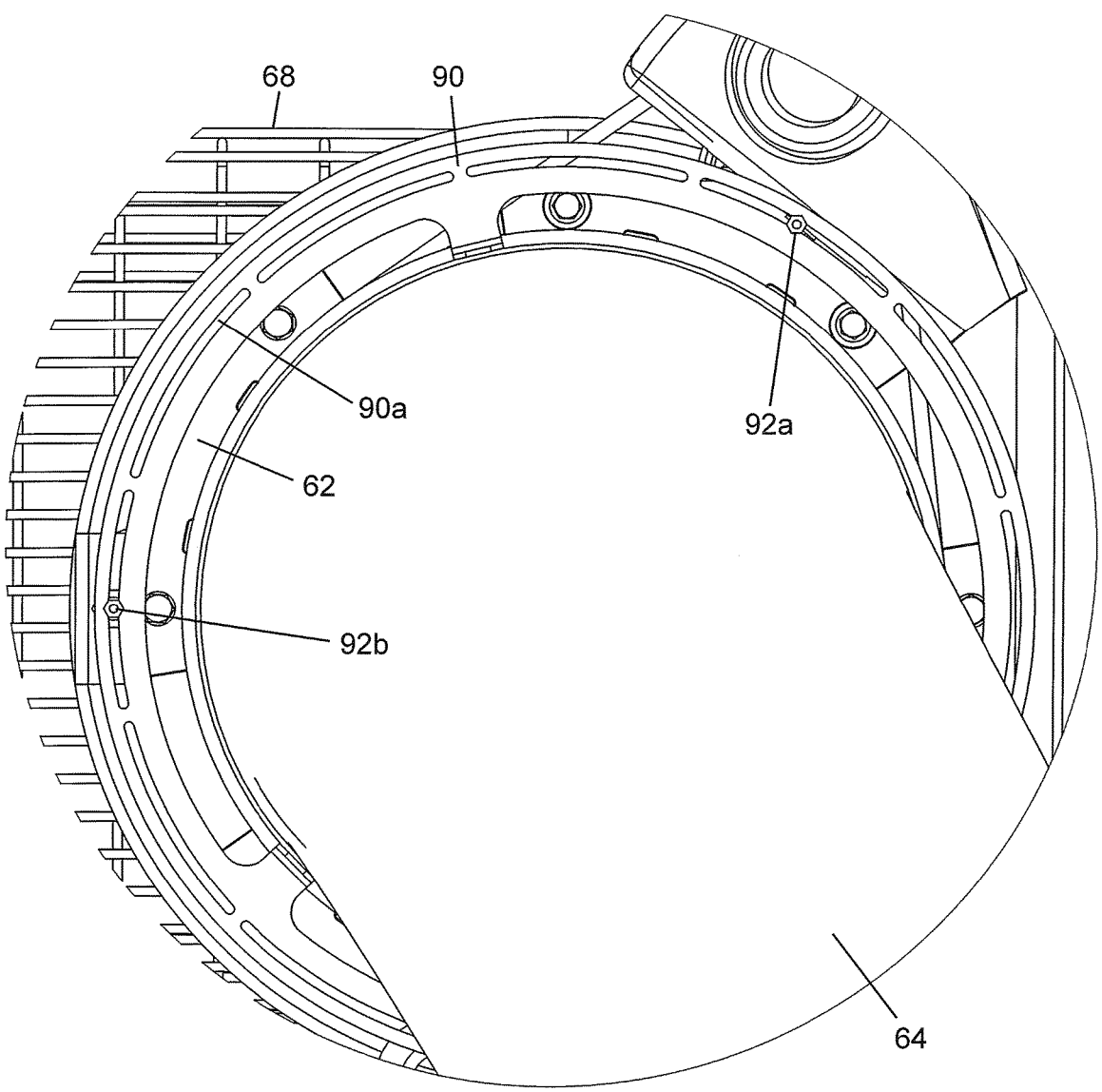
FIG. 4 shows a partial, enlarged, rear view of the debris blower of FIG. 1.
Figure 5:
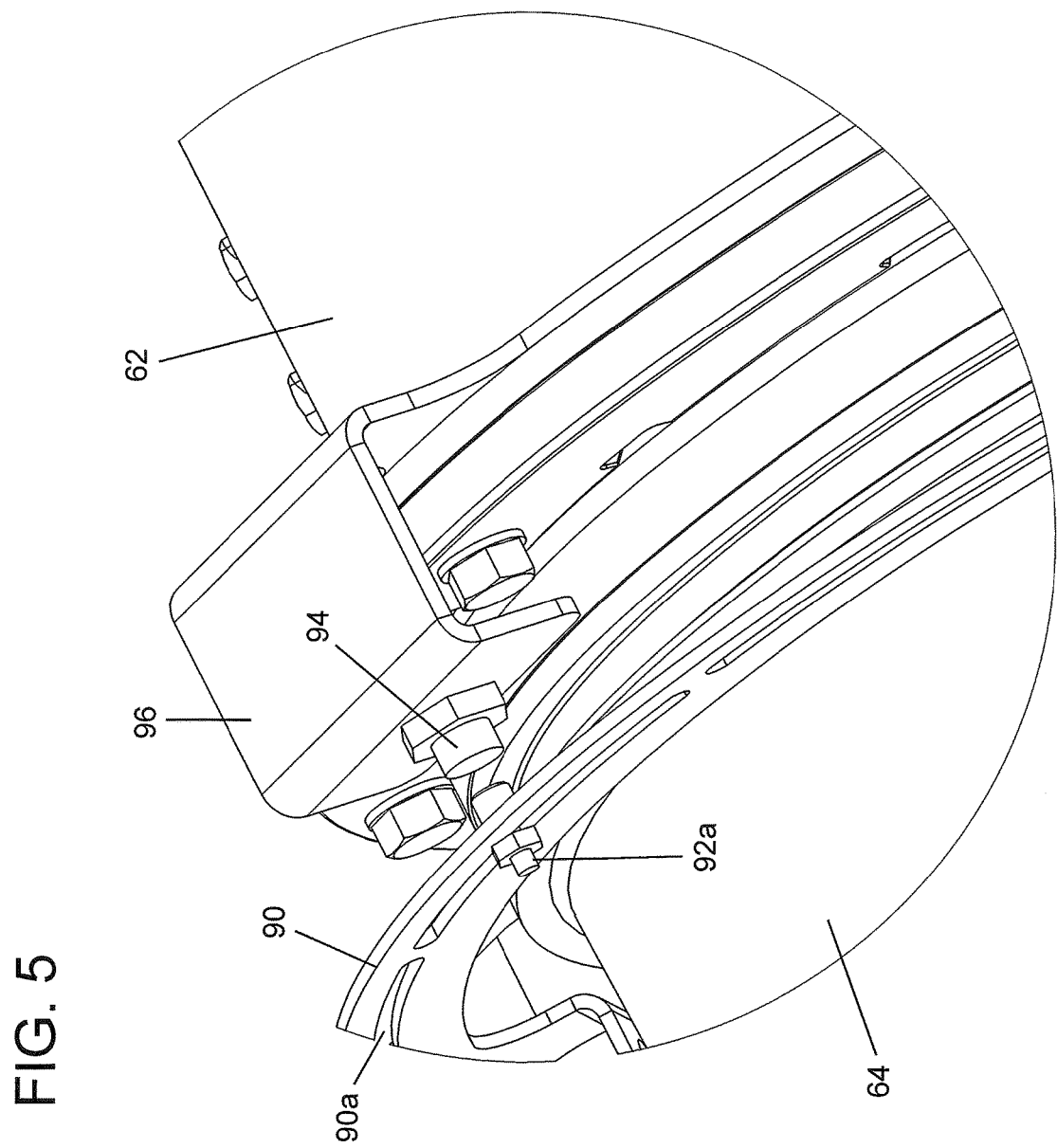
FIG. 5 shows a partial, enlarged, side view of the debris blower of FIG. 1.
Figure 6:
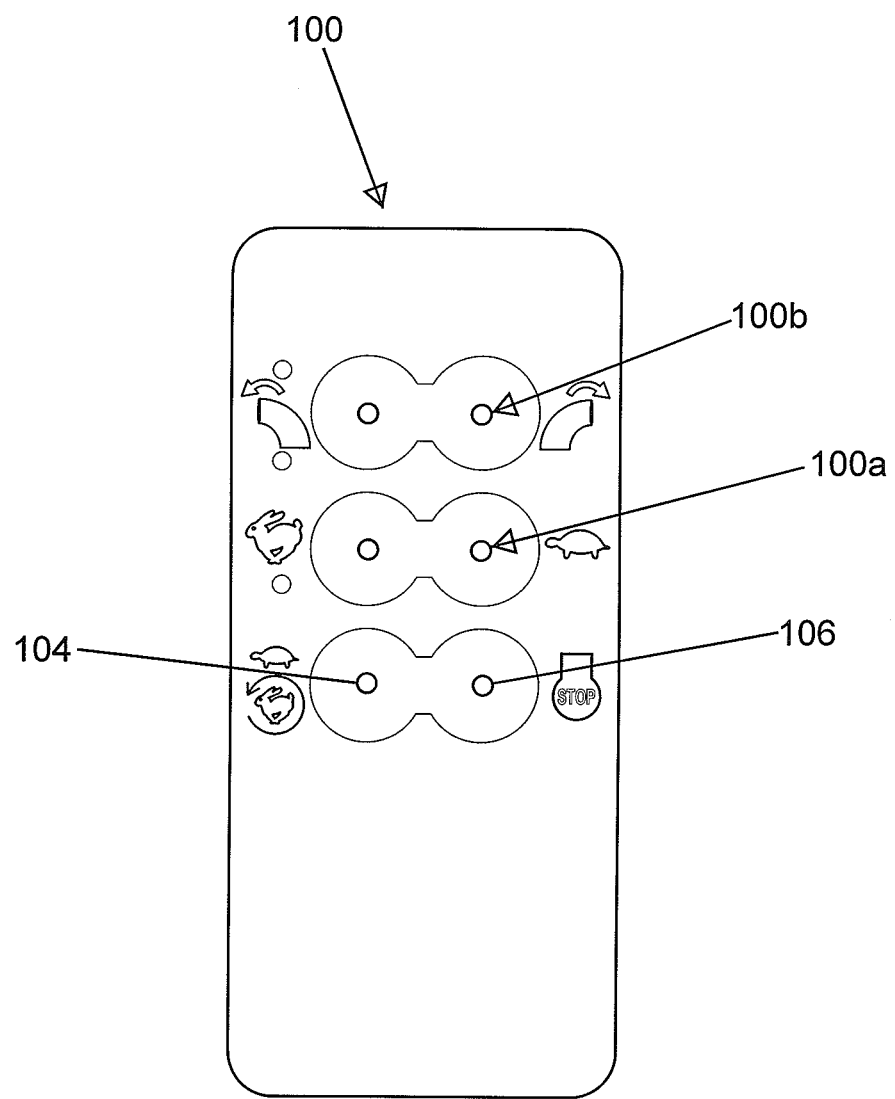
FIG. 6 shows a front view of wireless remote control of the debris blower of FIG. 1.
Figure 7:
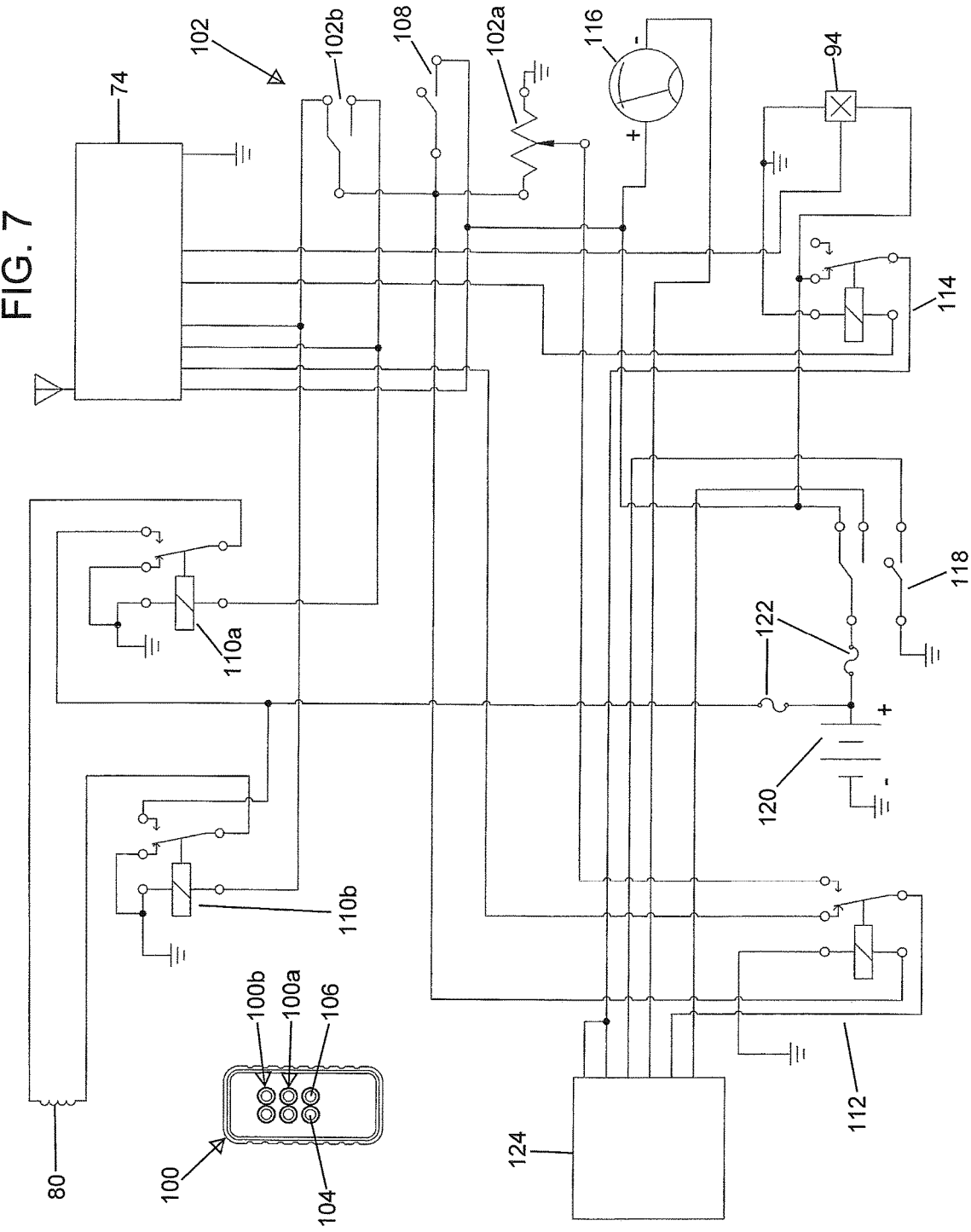
FIG. 7 shows an electrical schematic for the debris blower of FIG. 1.

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

A debris blower 10 includes a chassis 12 having a rectangular frame 14 including first and second sides 16 extending generally perpendicular between first and second ends 18. In the form shown, sides 16 and ends 18 have rectangular cross sections and include flat top surfaces 20 and 22, respectively. Furthermore, in the form shown, sides 16 and ends 18 are interconnected together by being beveled at 45° and interconnected together by welding.

Chassis 12 further includes a center cross brace 24 extending generally perpendicularly between sides 16 intermediate ends 18. Brace 24 has cross sections of a 90° corner and includes a first portion 24a extending parallel to top surfaces 20 and 22 and a second portion 24b extending generally perpendicular to top surfaces 20 and 22. Brace 24 is suitably connected to frame 14 such as by welding.

Chassis 12 further includes first and second longitudinal supports 30 and 32, with support 30 extending between first end 18 and brace 24 and with support 32 extending between brace 24 and second end 18. Supports 30 and 32 are channel shaped with inverted U-shaped cross sections. The width of support 30 is greater than the width of support 32 parallel to a plane defined by frame 14. Supports 30 and 32 are equidistant from first side 16, but support 30 is closer to second side 16 than support 32. Supports 30 and 32 are suitability connected to frame 14 and brace 24 such as by welding. In the form shown, the upper portion of support 30 includes a cutout 30a for receiving first portion 24a of brace 24 when connected together so that the upper portion of support 30 is coextensive and planar with first portion 24a of brace 24.

Chassis 12 further includes an engine or a motor mount 40 of a generally right parallelepiped shape. Specifically, mount 40 includes a planar top 42, first and second end walls 44 and front and second side walls 46. The height of side walls 46 adjacent end walls 44 is greater than that of end walls 44, with notches 48 formed in sidewall 46 at the interconnection with end walls 44 having a height generally coextensive with the lower edges of end walls 44 and being of a rectangular shape. The spacing of end walls 44 is greater than the spacing between second side 16 and support 30. Thus, the lower edges of end walls 44 and the top edges of notches 48 abut against top surface 20 of second side 16 and the top surface of support 30 while the vertical edges of notches 48 abut against the inside surfaces of second side 16 and support 30. Mount 40 can be suitably connected to second side 16 and support 30 such as by welding.

Chassis 12 further includes first and second top plates 50 and 52. Top plate 50 extends between ends 18 and between first side 16 and supports 30 and 32. Top plate 52 includes bolts 54 adjacent to its four corners, with bolts 54 suitably secured to prevent relative movement with respect to top plate 52 such as by welding. Top plate 52 extends between top surface 20 of second side 16 and supports 30 and 32 and is positioned intermediate and spaced from motor mount 40 and second end 18 and terminates intermediate brace 24 and second end 18. It should be appreciated that cut-outs can be formed in top surface 20 and/or in supports 30 and 32 for receipt of the heads of bolts 54 to prevent interference therewith. Top plates 50 and 52 can be suitably secured to frame 14 and supports 30 and 32 such as by welding.

Debris blower 10 further includes a turbine 60 including a housing 62 having an exit nozzle 64 rotatably coupled about an axis thereto and rotated by a motor 80. Housing 62 is suitably secured to second side 16 and support 32 and extending generally coextensive with top plate 52. An engine or motor 66 is suitably mounted to mount 40. A screen type guard 68 extends between motor 66 and housing 62 and encloses the drive interconnection between motor 66 and turbine 60. A battery 70, a fuel tank 72 for motor 66, and control box 74 are suitably mounted to top plate 50. Wheels 76 or other forms of transport are suitably secured to first and second sides 16. A hitch 78 is suitably secured to first end 18.

Nozzle 64 includes a circumferential positioning locator 90 shown extending concentrically around nozzle 64 and its rotation axis relative to housing 62. First and second trip devices 92a and 92b are circumferentially adjustably positioned relative to locator 90 such as being in the form of bolts slideably received in slots 90a. Debris blower 10 further includes a sensor 94 fixed to housing 62 such as by a bracket 96. Trip devices 92a and 92b are shown in the form of magnets, and sensor 94 is shown in the form of a magnetic pickup sensor. However, trip devices 92a and 92b and sensor 94 can take other forms such as tabs and a mechanical switch or the like. Likewise, although trip devices 92a and 92b are shown as being rotatable with nozzle 64, sensor 94 and trip devices 92a and 92b can be reversed on debris blower 10. Furthermore, although only two trip devices 92a and 92b are shown, it is possible to utilize more than two to provide options of having multiple angles for one or both sides of debris blower 10.

Debris blower 10 further includes a wireless remote control 100 and an auxiliary control 102 mounted to and hard wired to controller 74. Each control 100 and 102 includes a speed switch 100a and 102a controlling incremental throttling of engine 66 between idle and full revolution speeds. In the form shown, switch 100a is in the form of separate switch buttons, while switch 102a is in the form of a potentiometer. Each control 100 and 102 further includes a direction switch 100b and 102b controlling motor 80 and rotation of exit nozzle 64 relative to housing 62. In the form shown, switch 100b is in the form of separate switch buttons, while switch 102b is in the form of a rocker switch. Control 100 further includes a resume switch 104 which when actuated reduces the engine from a current operating speed set by speed switch 100a to the idle speed or from the idle speed back to the current operating speed. Control 100 further includes a kill switch 106 which stops engine 66 such as by shutting off the fuel supply. Control 102 further includes a key switch 108 actuating one of controls 100 and 102.

Controller 74 and direction switch 102b are electrically connected to clockwise and counterclockwise nozzle rotate relays 110a and 110b in turn electrically connected to motor 80. Controller 74 and speed switch 102a are electrically connected to a throttle control relay 112. Controller 74 is electrically connected to sensor 94. Kill switch 106 is electrically connected to controller 74 and speed and direction switches 102a and 102b. Controller 74 is electrically connected to a fuel relay 114, an hour meter 116 and a key switch 118. Filling out the electrical system is a battery 120, fuses 122 and an engine harness connection 124.

For purposes of explanation of an example mode of operation, it will be assumed that trip devices 92a and 92b have been positioned in locator 90 so that nozzle 64 extends at desired angles relative to housing 62. Positioning is performed by experimentation and according to the particular debris blower 10 and the particular operator. It will be further assumed that debris blower 10 is at the start of a first pass, engine 66 is at the idle revolution speed, such as at 1780 RPMs, switch 108 is actuating control 100, and nozzle 64 is at the desired angle relative to housing 62 with trip device 92a aligned with sensor 94. The operator then presses switch 100a to increase the engine speed to the current operating speed, up to 3900 RPMs. For one form, the engine speed is increased in increments of 100 RPMs such as by continuously holding switch 100a and/or by intermittently pressing switch 100a. When the engine speed is at the desired current operating speed, the operator engages the tow vehicle to pull debris blower 10 along the first path. Upon reaching the end of the first path, the operator activates resume switch 104 such that engine 66 is reduced from the current operating speed to the idle speed by software programmed in controller 74 and controller 100, turns the tow vehicle and debris blower 10 to align with a second path, and actuates direction switch 100b. When switch 100b is actuated, nozzle 64 will be rotated until trip device 92b is aligned with sensor 90. Slowing engine 66 to idle speed saves gas and is quieter as engine 66 is not running at full speed during turns. Once aligned with the second path, resume switch 104 is again actuated such that engine 66 increases from the idle speed to the current operating speed without having to actuate speed switch 100a. This process is repeated at the end of the second path to the beginning of the third path. In the event that it is desired to stop operation of debris blower 10, kill switch 106 can be operated.

If desired, such as if control 100 is lost or damaged, switch 108 can be actuated to allow operation of debris blower 10 by actuating switches 102a and 102b. If more than two trip devices 92 and 92b are provided, switch 100b and 102b can be actuated again to continue rotating in the same direction past trip device 92a or 92b to the next trip device. This function can be used if alternate angles for nozzle 64 are desired such as for blowing different types of debris.

It should be appreciated that a weld fixture can be utilized to form chassis 12 to insure that a parallelism and flatness tolerance exists between top surface 42 and top surfaces 20 and 22 of second side 16 and end 18 and the upper portion of support 30 to align motor 66 with turbine 60 in a manner that does not require shims to align turbine 60 with motor 66. Furthermore, since bolts 54 do not move relative to top plate 52, taking guard 68 off and on can be easily accomplished.

Now that the basic construction of debris blower 10 and modes of operation have been set forth, it should be appreciated that variations from the embodiment shown and described will be within the ordinary skill of the art. As examples, the shapes and the manner of interconnection of the elements of chassis 12 can take other forms which perform the functional aspect required. Likewise, although debris blower 10 includes several novel features in combination believed to produce synergistic results, such novel features could be used alone or in other combinations in a debris blower.

Thus since the invention disclosed herein may be embodied in other specific forms is without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Debris blower comprising, in combination: a chassis; a turbine having a housing including an exit nozzle rotatably coupled thereto, with the housing connected to the chassis; an engine mounted to the chassis; wheels connected to the chassis; a hitch connected to the chassis; first and second trip devices coupled to one of the exit nozzle and the housing; a sensor coupled to another of the exit nozzle and the housing, with the exit nozzle rotatably coupled to the housing about a rotation axis, with the first and second trip devices positionable at circumferentially spaced locations about the rotation axis, with the exit nozzle rotatable about the rotation axis to align the sensor with one of the first and second trip devices.

2. The debris blower as defined in claim 1, further comprising, in combination: a circumferential positioning locator extending concentrically to the rotation axis, with the circumferential positioning locator including slots extending concentrically to the rotation axis, with the first and second trip devices in the form of bolts slideably received and tightening in the slots.

3. The debris blower as defined in claim 2, wherein the first and second trip devices are magnets; and wherein the sensor is a magnetic pickup sensor.

4. The debris blower as defined in claim 1, further comprising, in combination: a motor rotating the exit nozzle; and a controller including at least a first switch controlling the motor, including at least a second switch controlling incremental throttling of the engine between idle and full revolution speeds, and at least a third switch controlling the engine between the idle speed and a current operating speed set by the at least second switch.

5. The debris blower as defined in claim 4, further comprising, in combination: a wireless remote control including the at least first, second and third switches; and an auxiliary control including a key switch, at least a fourth switch controlling throttling of the engine between the idle and full revolution speeds, and at least a fifth switch controlling the motor, with the key switch actuating one of the wireless remote control and the auxiliary control, with the auxiliary control fixed to the housing and hard wired to the engine and the motor.

6. Debris blower comprising, in combination: a chassis; a turbine having a housing including an exit nozzle rotatably coupled thereto, with the housing connected to the chassis; an engine mounted to the chassis; wheels connected to the chassis; a hitch connected to the chassis; a motor rotating the exit nozzle; and a controller including at least a first switch controlling the motor, including at least a second switch controlling incremental throttling of the engine between idle and full revolution speeds, and at least a third switch controlling the engine between the idle speed and a current operating speed set by the at least second switch.

7. The debris blower as defined in claim 6, further comprising, in combination: a wireless remote control including the at least first, second and third switches; and an auxiliary control including a key switch, at least a fourth switch controlling throttling of the engine between the idle and full revolution speeds, and at least a fifth switch controlling the motor, with the key switch actuating one of the wireless remote control and the auxiliary control, with the auxiliary control fixed to the housing and hard wired to the engine and the motor.

8. Method comprising:
    mounting an engine to a chassis;
    mounting a housing of a turbine to the chassis, with the housing including an exit nozzle rotatably coupled thereafter;
    connecting wheels to the chassis;
    connecting a hitch to the chassis;
    positioning first and second trip devices to one of the exit nozzle and the housing;
    coupling a sensor to another of the exit nozzle and the housing;
    rotating the exit nozzle relative to the housing about a rotation axis until the sensor aligns with the first trip device; and
    rotating the exit nozzle relative to the housing about the rotation axis until the sensor aligns with the second trip device.

9. The method as defined in claim 8, wherein positioning the first and second devices comprises positioning a circumferential positioning locator extending concentrically to the rotation axis, with the circumferential positioning locator including slots extending concentrically to the rotation axis; and slideably receiving and tightening the first and second trip devices in the form of bolts in the slots, wherein rotating the exit nozzle comprises providing the first and second trip devices in the form of magnets and providing the sensor in the form of a magnetic pickup sensor; and sensing the magnets by the magnetic pickup sensor.

10. The method as defined in claim 8, further comprising:
    incrementally throttling of the engine between idle and full revolution speeds to a current operating speed; and
    switching between the idle revolution speed and the current operating speed.

11. The method as defined in claim 10, further comprising:
    fixing an auxiliary control relative to the housing of the turbine; and
    actuating one of a wireless remote control and the auxiliary control, with actuating comprising switching a key switch of the auxiliary control, with each of the wireless remote control and the auxiliary control comprising at least a speed switch controlling incremental throttling of the engine between the idle and full revolution speeds and a direction switch controlling rotation of the exit nozzle relative to the housing.

12. Method comprising:
    mounting an engine to a chassis;
    mounting a housing of a turbine to the chassis, with the housing including an exit nozzle rotatably coupled thereafter;
    connecting wheels to the chassis;
    connecting a hitch to the chassis;
    incrementally throttling of the engine between idle and full revolution speeds to a current operating speed; and
    switching between the idle revolution speed and the current operating speed.

13. The method as defined in claim 12, further comprising:
    fixing an auxiliary control relative to the housing of the turbine; and
    actuating one of a wireless remote control and the auxiliary control, with actuating comprising switching a key switch of the auxiliary control, with each of the wireless remote control and the auxiliary control comprising at least a speed switch controlling incremental throttling of the engine between the idle and full revolution speeds and a direction switch controlling rotation of the exit nozzle relative to the housing.

* * * * *